United States Patent [19]

Gerber et al.

[11] 4,195,012

[45] Mar. 25, 1980

[54] PROCESS FOR PREPARING 2-CHLORO-1-METHYLAMINOAN-THRAQUINONE AND PLASTICS CONTAINING THE SAME

[75] Inventors: Samuel M. Gerber, Martinsville; Robert E. Misner, Flemington, both of N.J.

[73] Assignee: American Cyanamid Company, Stamford, Conn.

[21] Appl. No.: 946,685

[22] Filed: Sep. 28, 1978

Related U.S. Application Data

[63] Continuation-in-part of Ser. No. 891,369, Mar. 29, 1978, abandoned.

[51] Int. Cl.$^2$ .......................... C08K 5/08; C08K 5/18
[52] U.S. Cl. .................................. 260/42.21; 260/381
[58] Field of Search ................... 260/42.21, 381, 37 P

[56] References Cited

U.S. PATENT DOCUMENTS

| | | | |
|---|---|---|---|
| 1,858,334 | 5/1932 | Loneluck et al. | 260/381 |
| 4,076,735 | 2/1978 | Seha | 260/381 |

FOREIGN PATENT DOCUMENTS 164791 11/1905 Fed. Rep. of Germany ........... 260/381

OTHER PUBLICATIONS

Elzy and Rose, "Additives for Plastics–Colorants," Plastics Engineering, Jul. 1976, p. 20.

*Primary Examiner*—Sandra M. Person
*Attorney, Agent, or Firm*—Bruce F. Jacobs

[57] ABSTRACT

2-Chloro-1-methylaminoanthraquinone is prepared by methylation with methyl fluorosulfonate and is used as a red colorant, especially for taillight lenses.

7 Claims, No Drawings

PROCESS FOR PREPARING 2-CHLORO-1-METHYLAMINOANTHRAQUINONE AND PLASTICS CONTAINING THE SAME

This application is a continuation-in-part of U.S. Ser. No. 891,369, filed Mar. 29, 1978, and now abandoned.

Many halogenated methylaminoanthraquinones are known colorants.

Japanese Patent No. 51/37921 discloses the use of 6- and 7-chloro-1-alkylaminoanthraquinones to color resins. German Patent No. 164,791 discloses dyes having halogen substituent(s) on either ring of 1-methylaminoanthraquinones. However, neither patent discloses 2-halo-1-methylaminoanthraquinones, let alone the 2-chloro derivatives of the present invention, or suggests their utility as a red colorant.

The subject compound has been disclosed by Loskutov et al., Izv. Sib. Otd. Akad. Nauk SSSR, Ser. Khim. Nauk, 1975, No. 2, pages 128–133. It was prepared by reacting monomethylamine in dimethyl sulfoxide with 1-nitro-2-chloroanthraquinone for 72 hours. The only utility suggested for the compound was as an intermediate for the preparation of anthraquinoneimidazolines. The process of preparing the compound as detailed in the reference is unsatisfactory because it entails the use of 1-nitro-2-chloroanthraquinone as a starting material which is extremely difficult to prepare, the dimethyl sulfoxide is difficult to recover, and the chromatographic separation procedure is extremely time consuming and expensive.

Heretofore, 1-methylaminoanthraquinone (C. I. Solvent Red 111; C.I. 60505) has been used as a colorant for the plastic lenses of automobile taillights. However, this dye has several deficiencies, such as yellowness in shade and low intensity. There is a need, therefore, for a red colorant for automobile taillight lenses that will be bluer in shade and more intense than 1-methylaminoanthraquinone.

It has now been found that 2-chloro-1-methylaminoanthraquinone is a superior colorant for automobile taillight lenses in that the resulting lenses are bluer in shade and tinctorially more intense than those containing 1-methylaminoanthraquinone. However, 2-chloro-1-methylaminoanthraquinone cannot be readily prepared by conventional methods. There is a need, therefore, for a process for preparing 2-chloro-1-methylaminoanthraquinone.

In accordance with this invention, there are provided (1) a novel process for the preparation of a red colorant, 2-chloro-1-methylaminoanthraquinone,

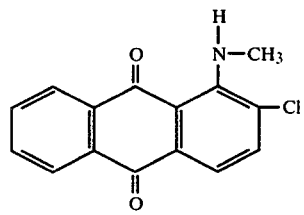

which comprises reacting about-equimolecular proportions of 1-amino-2-chloroanthraquinone and methyl fluorosulfonate in a carbocyclic aromatic solvent at an elevated temperature and recovering the product therefrom, and (2) plastic substrates containing said red colorant. Preferably, the plastic substrate is a poly(methyl methacrylate) and it is used for a taillight lens. The lenses of this invention are much bluer in shade and tinctorially more intense than lenses containing 1-methylaminoanthraquinone. Also, in accordance with the invention, the colorant may be incorporated in thermoplastic materials together with a suitable opacifier to provide similarly shaded substrates for use as decorative panels.

In carrying out the process of this invention, one molecular proportion of 1-amino-2-chloroanthraquinone may be reacted with about 1 to 1.1, preferably about 1.05, molecular proportions of methyl fluorosulfonate in a carbocyclic aromatic hydrocarbon solvent, preferably toluene, at about 80°–130° C., preferably about 100°–110° C., for about 16 to 24 hours, preferably about 20 to 22 hours. Suitable carbocyclic aromatic hydrocarbon solvents which may be used include benzene, toluene, xylene, chlorobenzene, 1,2-dichlorobenzene, 1,3-dichlorobenzene, 1,4-dichlorobenzene, and the like.

The reaction mixture may then be filtered while hot to separate the solid materials, and the filter cake slurried in dilute alkali, preferably 5 N caustic soda, at ambient temperature for about 0.5 hour to convert any quaternary ammonium compounds therefrom. The solid may then be recovered from the slurry, rinsed with water, and dried, or optionally sucked partially dry.

Preferably, the crude product is further purified by recrystallizing from hexane to obtain a product melting at 147°–148° C.

For the purpose of the invention, the colorant may be used in thermoplastic materials in general, of which the following are mentioned as illustrative examples: poly(vinyl chloride), poly(methyl methacrylate), poly(styrene), high impact poly(styrene), polycarbonate, poly(caprolactam), poly(hexamethylene adipamide), poly(hexamethylene terephthalamide), poly(methyl acrylate), poly(ethylene terephthalate), cellulose acetate, cellulose butyrate, butadiene-styrene copolymers, acrylonitrilestyrene copolymers and butadiene-acrylonitrile copolymers. Preferably the material is poly(methyl methacrylate).

While the plastic material may conventionally contain a plasticizer, it should not contain amounts which will cause the colorant to bleed, that is, about 25% or more. Preferably, no plasticizing agent should be used.

The amount of colorant used will depend on the thickness of the plastic substrate and the optical density desired. Generally, the amount incorporated in the plastic will range from about 0.02% to about 0.4%, preferably from about 0.1% to about 0.15%, based on the weight of a plastic substrate having a thickness of from about 50 to about 150 mils, preferably about 125–130 mils. Thus, the color intensity and shade depend on the thickness of the molded substrate.

In addition, the colorant may be incorporated in the plastic material together with an opacifier, such as titanium dioxide, zinc oxide, barium sulfate, calcium sulfate, or the like to provide plastic substrates for use as decorative panels. Generally, the amount of opacifier used is about twice that of the colorant and ranges from about 0.04% to about 0.8% based on the weight of the plastic material. The preferred opacifier is titanium dioxide.

The plastic compositions of the present invention can be formed into articles by conventional methods used in polymer processing such as injection or compression molding, casting, calendering, extruding, or the like.

The colorant and the plastic material, or the colorant, opacifier and plastic material, may be blended together by conventional methods such as melt blending, Banbury mixing, or the like.

The following examples will serve to illustrate the invention.

EXAMPLE 1

Preparation of 2-chloro-1-methylaminoanthraquinone

A solution of 1-amino-2-chloroanthraquinone (2.6 grams; 0.01 mole) and methyl fluorosulfonate (1.254 grams; 0.011 mole) in toluene (50 mls) was refluxed for 22 hours and filtered while hot. The residue in the flask was combined with the filter cake and the combined solids were slurried in 5 N sodium hydroxide at 25° C. for 0.5 hour. The slurry was then filtered, and the solid was rinsed with water and dried. The yield of product obtained was 41% of theoretical.

The crude product was dissolved in hexane and the solution concentrated and allowed to stand at room temperature overnight. The resulting precipitate was recovered, rinsed with a small amount of hexane and dried, m.p. 147°–148° C.

Analysis: Calculated for $C_{15}H_{10}NO_2Cl$: C, 66.31; H, 3.71; N, 5.15; Cl, 13.05. Found: C, 65.98; H, 3.98; N, 5.03; Cl, 12.60.

EXAMPLE 2

A solution of 1-amino-2-chloroanthraquinone (2.7 grams; 0.01 mole) and dimethyl sulfate (1.5 grams; 0.012 mole) in toluene (125 mls) was refluxed for 24 hours, cooled to 25° C. and filtered. Analysis of the recovered solid by thin layer chromatography showed the presence of only trace amounts of 2-chloro-1-methylaminoanthraquinone. The bulk of the product was unreacted 1-amino-2-chloroanthraquinone.

In the manner described above, substituting monochlorobenzene or acetonitrile for the toluene, similar results were obtained.

EXAMPLE 3

A mixture of 1-amino-2-chloroanthraquinone (2.7 grams; 0.01 mole) and dimethyl sulfate (33.3 grams; 0.26 mole) is heated at 50° C. for 24 hours, cooled to room temperature, added to diethyl ether (200 mls) and filtered to recover a solid product. Analysis of the product by thin layer chromatography showed that it was a mixture of 2-chloro-1-methylaminoanthraquinone and 1-amino-2-chloroanthraquinone. The yield of 2-chloro-1-methylaminoanthraquinone was estimated to be about 25% of theoretical.

EXAMPLE 4

The procedure of Example 3 was followed except that the reaction mixture was heated at 100° C. for 18 hours. The product obtained was 2-chloro-1-dimethylaminoanthraquinone.

EXAMPLE 5

A solution of 1-amino-2-chloroanthraquinone (2.7 grams; 0.01 mole) and dimethyl sulfate (1.5 grams; 0.012 mole) in N,N-dimethylacetamide (50 mls) was heated at 100° C. for 90 hours, cooled to room temperature and diluted with diethyl ether to precipitate a solid. Analysis of the product by thin layer chromatography showed only a trace amount of 2-chloro-1-methylaminoanthraquinone. Most of the product was unreacted 1-amino-2-chloroanthraquinone.

EXAMPLE 6

A solution of 1-amino-2-chloroanthraquinone (2.7 grams; 0.010 mole) and methyl p-toluenesulfonate (2.2 grams; 0.012 mole) in N,N-dimethylacetamide (50 mls) was heated at 100° C. for 90 hours. At this point, analysis of the solution by thin layer chromatography showed only a trace amount of 2-chloro-1-methylaminoanthraquinone was present.

Examples 3–6 illustrate that the desired compound, 2-chloro-1-methylaminoanthraquinone, cannot be prepared by utilizing conventional methylating agents.

EXAMPLE 7

(A) A red transparent lens, suitable for use in an automotive taillight, having a thickness of 125 mils, was prepared by melt-blending the following materials, cutting the blended composition into small squares and compression molding the squares.

|  | Parts |
|---|---|
| Poly(methyl methacrylate) | 100 |
| 2-Chloro-1-methylaminoanthraquinone | 0.1 |

(B) The procedure of (A) above was followed except that 1-methylaminoanthraquinone (C.I. Solvent Red 111) was substituted for 2-chloro-1-methylaminoanthraquinone. Comparison of the resulting lens with the lens of (A) above showed that the lens of (A) was bluer in shade and more intense in color.

EXAMPLE 8

A red decorative plastic substrate was prepared in the manner of Example 7 by compression molding the following composition.

|  | Parts |
|---|---|
| Poly(methyl methacrylate) | 100 |
| Titanium dioxide | 0.1 |
| 2-Chloro-1-methylaminoanthraquinone | 0.05 |

The resulting opaque plastic material has a blue shade similar to that of the transparent lens of Example 7(A).

EXAMPLES 9–10

Molded poly(methyl methacrylate) lenses were prepared after the fashion of Example 7 containing 0.1% of 2-chloro-1-methylaminoanthraquinone (1) and 0.1% of 1-methylaminoanthraquinone (2), respectively, at different thicknesses and compared for dye intensity and shade. The following results were obtained:

| Example | Thickness (mils) | Appearance |
|---|---|---|
| 9 | 125 | The lens containing (1) was significantly more intense in color and bluer in shade. |
| 10 | 59–60 | The lens containing (1) was more intense in color and very slightly bluer in shade. |

We claim:

1. A thermoplastic polymer substrate of from about 50 to about 150 mils thickness containing from about 0.02 to about 0.4%, by weight, based on the weight of said substrate, of a red colorant, 2-chloro-1-methylaminoanthraquinone.

2. The substrate of claim 1 which is in the form of a transparent lens.

3. The substrate of claim 1 wherein the polymer is poly(methyl methacrylate).

4. The substrate of claim 1 further containing about 0.04 to about 0.8%, by weight, based on the weight of the substrate, of an opacifying agent.

5. The substrate of claim 4 which is in the form of a decorative panel.

6. The substrate of claim 4 wherein the polymer is poly(methyl methacrylate).

7. The substrate of claim 6 wherein the opacifying agent is titanium dioxide.

* * * * *